United States Patent
Münning et al.

(10) Patent No.: US 12,103,536 B2
(45) Date of Patent: Oct. 1, 2024

(54) METHOD FOR GENERATING A CHANGE OF TRAVEL LANE RECOMMENDATION, LANE CHANGE ASSISTANCE SYSTEM, AND MOTOR VEHICLE HAVING A LANE CHANGE ASSISTANCE SYSTEM

(71) Applicant: Volkswagen Aktiengesellschaft, Wolfsburg (DE)

(72) Inventors: Daniel Münning, Braunschweig (DE); Lukas Ackert, Frellstedt (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 268 days.

(21) Appl. No.: 17/580,897

(22) Filed: Jan. 21, 2022

(65) Prior Publication Data
US 2022/0234587 A1 Jul. 28, 2022

(30) Foreign Application Priority Data
Jan. 25, 2021 (DE) ...................... 10 2021 200 636.1

(51) Int. Cl.
*B60W 30/18* (2012.01)
*B60W 40/02* (2006.01)
(Continued)

(52) U.S. Cl.
CPC ... *B60W 30/18163* (2013.01); *B60W 2520/10* (2013.01); *B60W 2552/10* (2020.02);
(Continued)

(58) Field of Classification Search
CPC ....... B60W 30/18163; B60W 2520/10; B60W 2552/10; B60W 2554/4041;
(Continued)

(56) References Cited

U.S. PATENT DOCUMENTS 7,610,121 B2    10/2009 Nishira et al. .................... 701/1
9,672,734 B1 *  6/2017 Ratnasingam .......... H04W 4/44
(Continued)

FOREIGN PATENT DOCUMENTS

DE    102005051597 A1    5/2006   ............. B60K 31/00
DE    102017005166 A1   12/2017   ............. B60W 30/08
(Continued)

OTHER PUBLICATIONS

German Office Action, Application No. 102021200636.1, 7 pages, Oct. 12, 2021.

*Primary Examiner* — Abby Y Lin
*Assistant Examiner* — Hossam M Abd El Latif
(74) *Attorney, Agent, or Firm* — Slayden Grubert Beard PLLC (57) ABSTRACT

The disclosure relates a method for generating a change of travel lane recommendation for a motor vehicle from a starting travel lane into a target travel lane, wherein the motor vehicle moves along the starting travel lane at an own speed. A current position of the motor vehicle along the starting travel lane is determined in a digital environment map. A known starting travel lane speed is stored in the digital environment map for the current position along the starting travel lane. A lane change assistant compares the own speed of the motor vehicle with the starting travel lane speed and generates the change of travel lane recommendation as soon as a deviation between the own speed and the starting travel lane speed reaches a predefined threshold.

20 Claims, 4 Drawing Sheets

(51) Int. Cl.
*B60W 40/105* (2012.01)
*B60W 50/14* (2020.01)
*G08G 1/01* (2006.01)
*G08G 1/0962* (2006.01)
*G08G 1/0967* (2006.01)
*G08G 1/16* (2006.01)

(52) U.S. Cl.
CPC ............... *B60W 2554/4041* (2020.02); *B60W 2554/802* (2020.02); *B60W 2554/804* (2020.02); *B60W 2555/60* (2020.02)

(58) Field of Classification Search
CPC ..... B60W 2554/802; B60W 2554/804; B60W 2555/60; B60W 2554/408; B60W 50/14; B60W 40/02; B60W 40/105; B60W 2554/80; G08G 1/0112; G08G 1/0129; G08G 1/0133; G08G 1/0145; G08G 1/09623; G08G 1/09626; G08G 1/096716; G08G 1/096741; G08G 1/096775; G08G 1/096791; G08G 1/163; G08G 1/167

USPC ......................................................... 701/26
See application file for complete search history.

(56) References Cited

U.S. PATENT DOCUMENTS

| | | |
|---|---|---|
| 2013/0282264 A1 | 10/2013 | Bastiaensen et al. ........ 701/119 |
| 2015/0194055 A1 | 7/2015 | Maass et al. ................. 340/905 |
| 2016/0307444 A1* | 10/2016 | Koshizen .......... G08G 1/096791 |
| 2018/0061236 A1 | 3/2018 | Yamamoto |
| 2020/0189598 A1 | 6/2020 | Eigel et al. |
| 2020/0241547 A1 | 7/2020 | Hashimoto et al. |
| 2021/0016778 A1* | 1/2021 | Yashiro ................. B60W 10/04 |
| 2021/0122374 A1* | 4/2021 | Da Silva ............. G01C 21/3658 |
| 2021/0343148 A1* | 11/2021 | Lee .......................... H04W 4/38 |
| 2022/0223036 A1* | 7/2022 | Chikamori ......... G01C 21/3461 |

FOREIGN PATENT DOCUMENTS

| | | | |
|---|---|---|---|
| DE | 102017216202 A1 | 3/2019 | ............ B60W 30/12 |
| DE | 102018202736 A1 * | 8/2019 | |

* cited by examiner

METHOD FOR GENERATING A CHANGE OF TRAVEL LANE RECOMMENDATION, LANE CHANGE ASSISTANCE SYSTEM, AND MOTOR VEHICLE HAVING A LANE CHANGE ASSISTANCE SYSTEM

CROSS-REFERENCE TO RELATED APPLICATIONS

This application claims priority to German Patent Application No. DE 10 2021 200 636.1, filed on Jan. 25, 2021 with the German Patent and Trademark Office. The contents of the aforesaid Patent Application are incorporated herein for all purposes.

TECHNICAL FIELD

The invention relates to a method for operating a driver assistance system for a motor vehicle, more precisely for operating a lane change assistance system, wherein a change of travel lane recommendation is generated for the motor vehicle. Furthermore, the invention relates to a lane change assistance system of this kind and to a motor vehicle having a lane change assistance system.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Driver assistance systems for supporting a vehicle driver while performing a desired or planned or required driving maneuver are well-known. These also include known systems for assisting with a change of travel lane. The focus of known lane change assistance systems is to monitor traffic currently surrounding a subject vehicle or ego vehicle. The monitoring may take place by means of sensors of the ego vehicle or by means of communication between the ego vehicle and the road users surrounding same. In the case where the surrounding road users are other motor vehicles (third-party vehicles), the known lane change assistance systems rely on car-to-car communication between the ego vehicle and the other road users.

A feature common to lane change assistance systems may be that they depend on the current observations of the traffic situation and/or on live communication with the motor vehicles surrounding a relevant ego vehicle. This produces several disadvantages. Firstly, permanent monitoring of the surrounding traffic situation and/or more or less constant live communication with other road users requires an increased processing capacity for the data accumulating within the ego vehicle as a result of this. In other words, a not inconsiderable computing capacity must be maintained for processing the results of the monitoring and/or for processing the communication flows in the ego vehicle. Secondly, the known approaches only allow for estimation of the prospects of success of a traffic maneuver once the ego vehicle is already in a traffic situation in which a traffic maneuver will have effects on other road users. Without the presence of other road users that may be monitored and/or with whom communication may take place, the known systems are completely incapable of estimating a level of safety of a lane change maneuver.

SUMMARY

A need exists to increase the safety of maneuvers for changing travel lane.

The need is addressed by the subject matter of the independent claims. Embodiments are disclosed in the dependent claims, the description, and the drawings.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

Some embodiments are based on the realization that the safety of a maneuver for changing travel lane may for example be increased in that the maneuver may be planned in advance and irrespectively of other road users currently present and, if applicable, also carried out.

Some embodiments provide a method for generating a change of travel lane recommendation for a motor vehicle or ego vehicle from a starting travel lane into a target travel lane of a road along which the motor vehicle is moving at an 'own speed', also referred to herein as a 'particular speed' or 'speed particular to the vehicle'. The road is for example a multi-lane road. For example, the road may be a road having multiple travel lanes in each direction of travel, for example a highway.

While the motor vehicle is traveling along the starting travel lane of the road at to the own speed of said motor vehicle, a current position of the motor vehicle is determined in a digital environment map. This may be achieved, for example, by means of GPS-based and/or compound navigation-based locating methods (GPS=Global Positioning System).

Alternatively or additionally, the current position may be determined using environment data. This is described in more detail in the following.

Said environment data may be recorded by means of a sensor device. For this purpose, the sensor device may comprise a plurality of sensors, for example camera sensors and/or radar sensors and/or lidar sensors. The sensor device may be permanently installed in the motor vehicle, or it may be designed to be readily removable from the motor vehicle, for example as a retrofit solution.

The environment data that may be recorded by the sensor device may include current distances between the motor vehicle and predefined stationary landmarks in the surroundings of the motor vehicle. A landmark of this kind may for example be an infrastructure component, such as a road sign or traffic light or a characteristically designed section of a guardrail. However, buildings and/or plants alongside the road may also be considered as landmarks. The camera sensors of the sensor device may be designed to recognize the landmarks based on acquired image data sets. Known image data processing algorithms may be used for this purpose. The radar sensors of the sensor device may in turn be designed to determine a current distance between the motor vehicle and an identified landmark of this kind. The landmarks may be recorded or stored in the digital environment map of the road. In other words, a digital environment map or road map may exist for the road along which the ego vehicle is moving. The local or geographic positions of the landmarks may be entered in this digital environment map.

For example, a locating unit may find one or more identified landmarks in the digital environment map. Based on the current distances between the motor vehicle and the landmarks, the current position of the motor vehicle along the starting travel lane of the road may then be determined in the digital environment map. In other words, the ego vehicle may for example locate the identified landmarks exactly in the digital environment map. The locating process may for example have an accuracy or resolution of less than 5 m, for example less than 3.5 m.

As a result, it is possible to identify which lane of a multi-lane road, for example a highway, the ego vehicle is moving along.

It is not only possible to store the positions of the landmarks in the digital environment map, but also additional information relating to the road and/or surroundings.

In some embodiments, an average known starting travel lane speed is stored in the digital environment map for the current position along the starting travel lane. Said known starting travel lane speed may have been calculated based on historic speed data or swarm data of other motor vehicles that have previously traveled along the starting travel lane and may then have been stored in the map (swarm data analysis).

In some embodiments, a lane change assistant compares the own speed of the ego vehicle with the starting travel lane speed resulting from the swarm data analysis. As soon as a deviation between the own speed and the starting travel lane speed reaches a predefined threshold, the lane change assistant generates a change of travel lane recommendation from the starting travel lane into the target travel lane.

Some embodiments provide the benefit that the ego vehicle does not rely on live communication with other road users currently in the surroundings in order to identify the need for a change of travel lane. In other words, the need for a change of travel lane may be identified irrespective of a current traffic volume. This is the case, for example, if the ego vehicle establishes based on the above-described speed comparison that its current own speed does not match the average speed in its current travel lane. Because a recommendation for a change of travel lane may be made at an earlier point in time based on the speed comparison, a situation at a later point in time in which another road user, for example another motor vehicle, has to approach the ego vehicle such that same is forced to change travel lane is prevented. In other words, it is possible to prevent critical driving situations, and the safety of a change of travel lane is increased with respect to the known methods.

In some embodiments, the lane change assistant generates the change of travel lane recommendation as soon as the own speed is closer to an average known target travel lane speed than to the starting travel lane speed. In other words, not only is a starting travel lane speed known from the swarm data or from the swarm data analysis, but also is an average target travel lane speed of the target travel lane. As such, the lane change recommendation is generated if it is identified that the current own speed of the ego vehicle is closer to the target travel lane speed than to the speed in the starting travel lane, in which the ego vehicle is currently traveling. If, for example, the known starting travel lane speed is 120 km/h and the target travel lane speed is 80 km/h, according to the embodiments described here, the change of travel lane recommendation is generated as soon as the own speed is less than 100 km/h. If there are multiple possible target travel lanes, it is possible in some embodiments to indicate not only that a change of travel lane from the starting travel lane would be sensible, but also which of the possible target travel lanes best matches the current own speed. A good example of this is travel on a highway. A highway may have three travel lanes, wherein, according to right-hand traffic rules, the travel speed is slowest on the right-hand of the three lanes and fastest on the left-hand of the three lanes. The travel speed on the central lane is generally between the speeds that typically occur on the right-hand and left-hand lane. An average travel speed on the right-hand lane may for example be 80 km/h, on the central lane 100 km/h, and on the far-left lane 120 km/h. If it is then determined that the ego vehicle is traveling at a speed of between 80 and 90 km/h on the left-hand lane, a change of travel lane recommendation may be generated which recommends not only a change from the left-hand lane, but also a change ideally into the far-right travel lane, since the own speed best matches the travel speed typical for the right-hand lane.

In some embodiments, the lane change assistant generates the change of travel lane recommendation if it is identified that the target travel lane is unoccupied at least within a target area. "Target area" means the area of the target travel lane in which the ego vehicle would likely arrive in the target travel lane in the event of a lane change.

As a result, the safety of a change of travel lane is increased. The fact that the target travel lane is unoccupied within the target area may also be recognized by means of the camera sensors of the sensor device, for example.

In some embodiments, the change of travel lane recommendation is generated if the target travel lane is assigned to at least one predefined travel lane category. In other words, the change of travel lane recommendation is only generated if the target travel lane is not an off-ramp or shoulder, for example. The item of information relating to the travel lane category of the target travel lane may come from the information stored in the digital environment map in the form of swarm data.

Alternatively or additionally and in some embodiments, the lane change assistant may generate the change of travel lane recommendation if at least one distance between the ego vehicle and at least one other motor vehicle in the starting travel lane is less than a predefined minimum distance. In other words, even in the event of a deviation of the own speed from the average starting travel lane speed, the change of travel lane recommendation may only be generated if, for example, the ego vehicle approaches too close to another vehicle driving in front and/or if a motor vehicle approaches the ego vehicle from behind such that the distance falls below the predefined minimum distance. This results in that unnecessary changes of travel lane may be avoided.

Alternatively or additionally and in some embodiments, the lane change assistant may generate the change of travel lane recommendation if it is identified that another motor vehicle is approaching the motor vehicle or ego vehicle from behind at a predefined minimum speed. In other words, a condition for outputting the change of travel lane recommendation may be that the other motor vehicle approaches the ego vehicle from behind such that there is the potential for a critical driving situation. This may for example be the case when the motor vehicle approaching the ego vehicle from behind has a speed that is at least one and a half times the speed of the ego vehicle, for example. The approach of the approaching vehicle may be identified in different ways. For example, the ego vehicle itself may use radar and/or lidar to identify that the motor vehicle is approaching from behind. Alternatively or additionally and in some embodiments, the approaching motor vehicle may signal to the ego vehicle by means of car-to-car communication that it is approaching.

One possible example implementation of the last-described embodiment may consist in the ego vehicle and/or the approaching motor vehicle identifying that a potential target travel lane is unoccupied. This may be determined by means of camera sensors and/or radar and/or lidar sensors of the vehicles. In other words, the change of travel lane recommendation may be generated if an approaching motor vehicle approaches the ego vehicle from behind at a different speed as described above and if a potential target travel lane is also unoccupied. In this context, the above-described use of swarm data is particularly beneficial for determining a travel lane category of the unoccupied target travel lane. As a result, it may be ensured that no change of travel lane recommendation is generated for an off-ramp and/or shoulder.

Alternatively or additionally and in some embodiments, the approaching motor vehicle may issue a warning to the ego vehicle via car-to-car communication if the target travel lane is unoccupied.

In some embodiments, the lane change assistant generates the change of travel lane recommendation if it is identified that the ego vehicle is passed at least once by another motor vehicle on the target travel lane. For example, the change of travel lane recommendation is generated if a passing procedure of this kind occurs within a predefined time interval. This may be for example beneficial for a driving situation on a highway in which the ego vehicle is traveling on the left-hand, i.e., the fastest, travel lane and is passed at least once within, for example, 10 minutes on a travel lane to the right.

In some embodiments, the plausibility of the starting travel lane speed and/or the target travel lane speed is checked by means of a comparison with at least one other average known travel speed of another travel lane arranged adjacent to the starting travel lane and/or target travel lane. This results in the benefit that the information relating to the individual travel lanes provided by means of the swarm data analysis is validated to a greater extent.

Some embodiments relate to a lane change assistance system that is designed to carry out the method according to one or more of the embodiments described herein. The lane change assistance system may in some embodiments comprise a sensor device that is designed to perform the method steps of the method performed by means of the sensor device. A sensor device of this kind may for example comprise one or more camera sensors and/or radar sensors and/or lidar sensors. The sensor device may also comprise a computing unit that is designed to process the data recorded by the respective sensors.

The lane change assistance system may also in some embodiments comprise a locating unit that is designed to perform the method steps, which may be performed by the locating unit in accordance with the method. For example, the digital environment map may be stored in the locating unit. Furthermore, the lane change assistance system may comprise a lane change assistant that is designed to carry out the method steps according to one or more embodiments relevant to the lane change assistant. This includes, for example, generating the change of travel lane recommendation and/or generating a corresponding display for a vehicle occupant or vehicle driver.

Furthermore, the present teachings relate to a motor vehicle comprising a lane change assistance system of this kind.

Also belonging to the present discussion are embodiments of the lane change assistance system and/or of the motor vehicle that have features which have already been described in connection with the embodiments of the method, and vice versa. For this reason, the corresponding embodiments of the lane change assistance system and/or of the motor vehicle will not be described again.

Reference will now be made to the drawings in which the various elements of embodiments will be given numerical designations and in which further embodiments will be discussed.

In the exemplary embodiments described herein, the described components of the embodiments each represent individual features that are to be considered independent of one another, in the combination as shown or described, and in combinations other than shown or described. In addition, the described embodiments can also be supplemented by features of the invention other than those described.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

Figure 1:
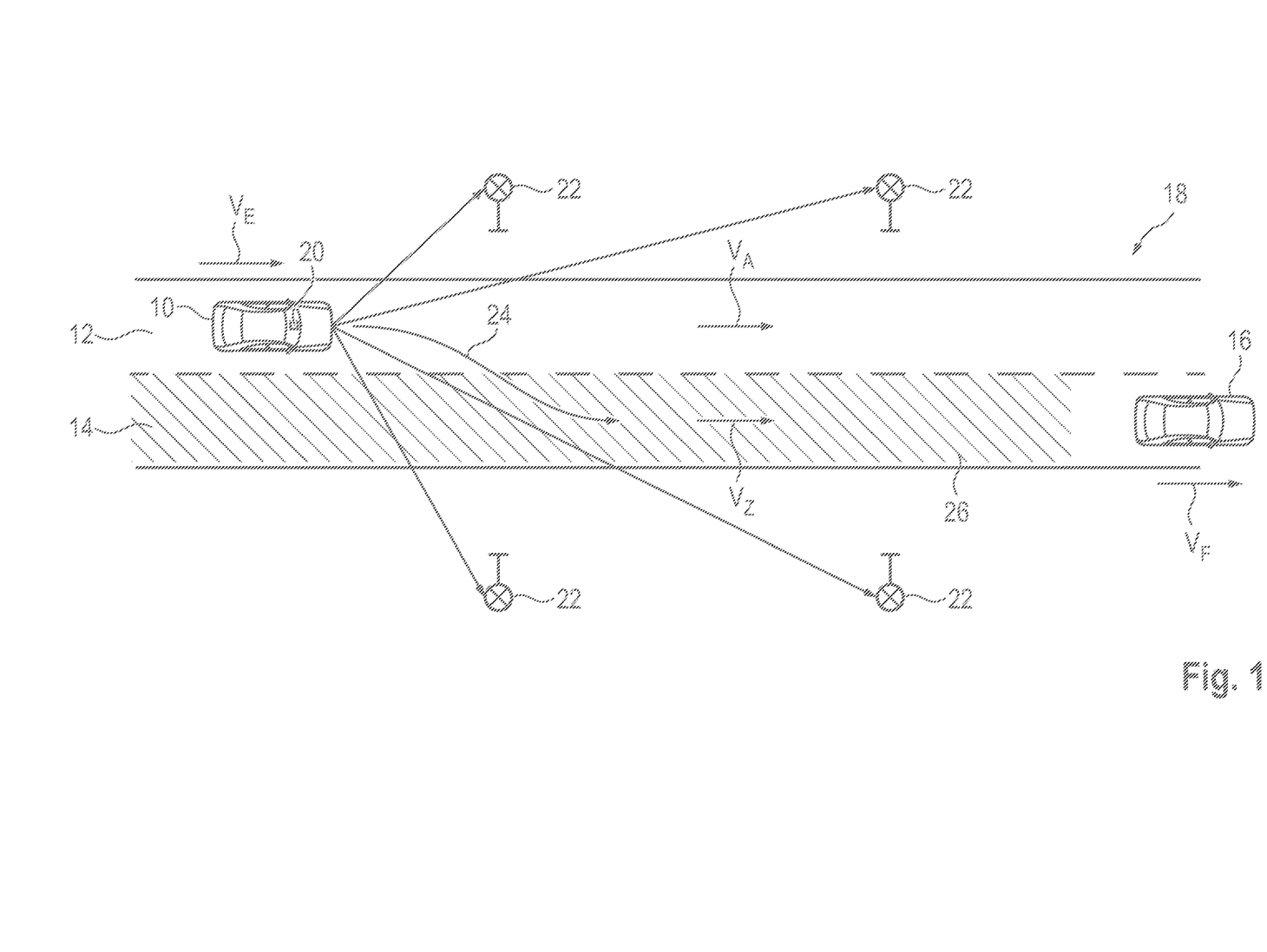
FIG. 1 is a schematic representation of an example of a driving situation.

FIG. 1 shows an example of a driving situation. In the driving situation shown, a motor vehicle or ego vehicle 10 is moving at an own speed vE along a starting travel lane 12. Another motor vehicle or third-party vehicle 16 is moving along a target travel lane 14 arranged adjacent to the starting travel lane 12 at a third-party vehicle speed vF. The two travel lanes 12, 14 are part of a road 18 along which the example driving situation takes place.

In the exemplary embodiment shown in FIG. 1, the ego vehicle 10 comprises a lane change assistance system 20 that will be described in more detail in connection with the explanations relating to FIG. 3. The driving situation set out in the following involves method steps that are carried out by means of the components of the lane change assistance system 20, which will likewise be described in more detail in connection with FIG. 3. For clarity, said components are not shown in more detail in FIG. 1 described here. For a more detailed description of the above-mentioned components, the reader should refer to the explanations in connection with FIG. 3.

Environment data that include current distances between the ego vehicle 10 and predefined stationary landmarks 22 in the surroundings of the ego vehicle 10 may be recorded in the ego vehicle 10 during travel along the starting travel lane 12. In FIG. 1, the current distances are represented, by way of example, by means of arrows between the ego vehicle 10 and the four landmarks 22 shown here by way of example.

The ego vehicle 10 may be located in a digital environment map (not shown here) of the road 18 based on the current distances from the landmarks 22. In other words, a respective current own position of the ego vehicle 10 along the starting travel lane 12 may be determined in the digital environment map based on the distances between the ego vehicle 10 and the landmarks 22.

The respective current own position may also be determined in another manner, for example by means of GPS-based or compound navigation-based methods.

An average known starting travel lane speed vA may be stored in the digital environment map.

The driving situation shown by way of example in FIG. 1 may be based on the fact that the own speed vE particular to the ego vehicle 10 deviates from the starting travel lane speed vA. A change of travel lane recommendation 24 may be generated for the ego vehicle 10 in the case where a deviation between the vehicle's own speed vE and the starting travel lane speed vA reaches a predefined threshold. If, for example, it is identified that the own speed vE of the ego vehicle 10 is closer to a target travel lane speed vZ than to the starting travel lane speed vA, a particularly urgent change of travel lane recommendation 24 may be generated.

If a vehicle driver of the ego vehicle 10 follows the change of travel lane recommendation 24, said driver will move into the target travel lane 14 behind the third-party vehicle 16 within a target area 26 shown as a hatched area here. As a result, the starting travel lane 12 is then free for other road users (not shown here) whose speed corresponds to the starting travel lane speed vA.

Figure 2:
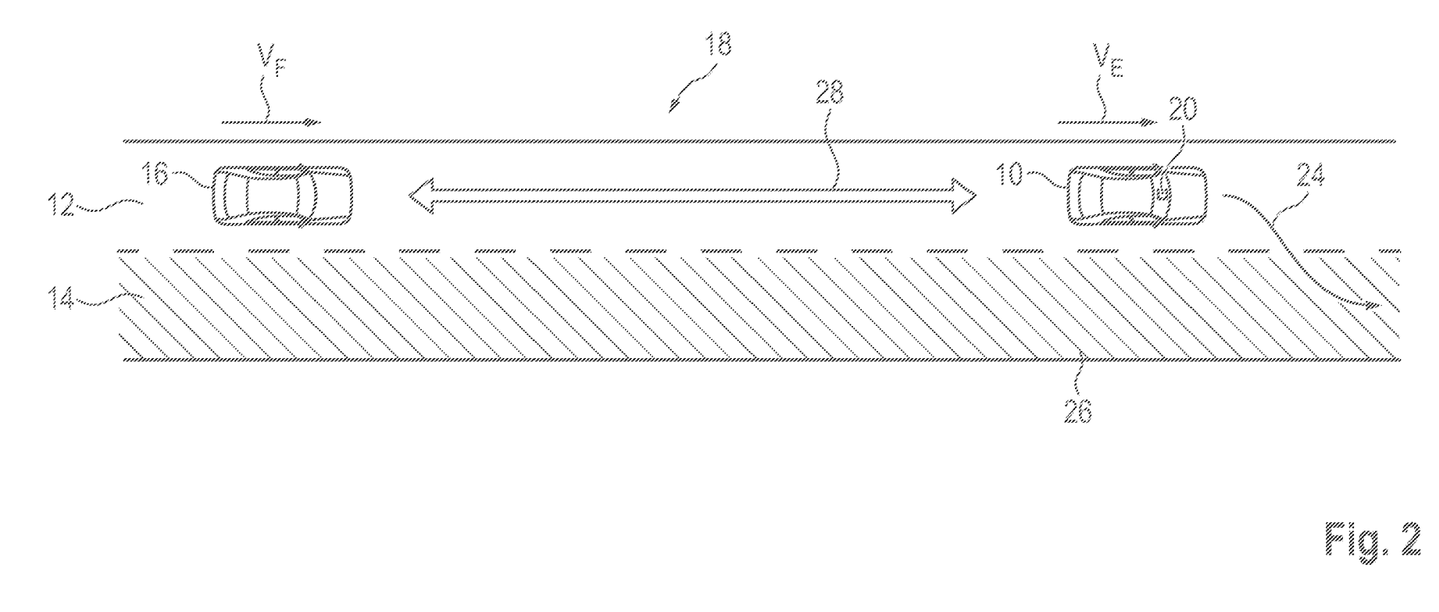
FIG. 2 is a schematic representation of another example of a driving situation.

Another example of a driving situation is represented schematically in FIG. 2 with reference to the components designated and described in connection with FIG. 1. In the driving situation shown here, the ego vehicle 10, which is traveling with its own speed vE, is in the starting travel lane 12 in front of a third-party vehicle 16 that is traveling at a third-party vehicle speed vF.

For the driving situation shown here, it is assumed that the third-party travel speed vF of the third-party vehicle 16 is at least 1.5 times greater than the own speed vE of the ego vehicle 10. If the distance between the two vehicles 10, 16 falls below a predefined minimum distance 28, an urgent change of travel lane recommendation 24 may be output.

The change of travel lane recommendation 24 is for example generated if it is identified that the target travel lane 14 is unoccupied at least within the target travel area 26. For example, car-to-car communication may additionally or alternatively take place between the third-party vehicle 16 and the ego vehicle 10. For example, information in the digital environment map may be used to identify that the target travel lane 14 is not an off-ramp or shoulder. In other words, the target travel lane 14 may be validated by means of the swarm data stored in the digital environment map.

Figure 3:
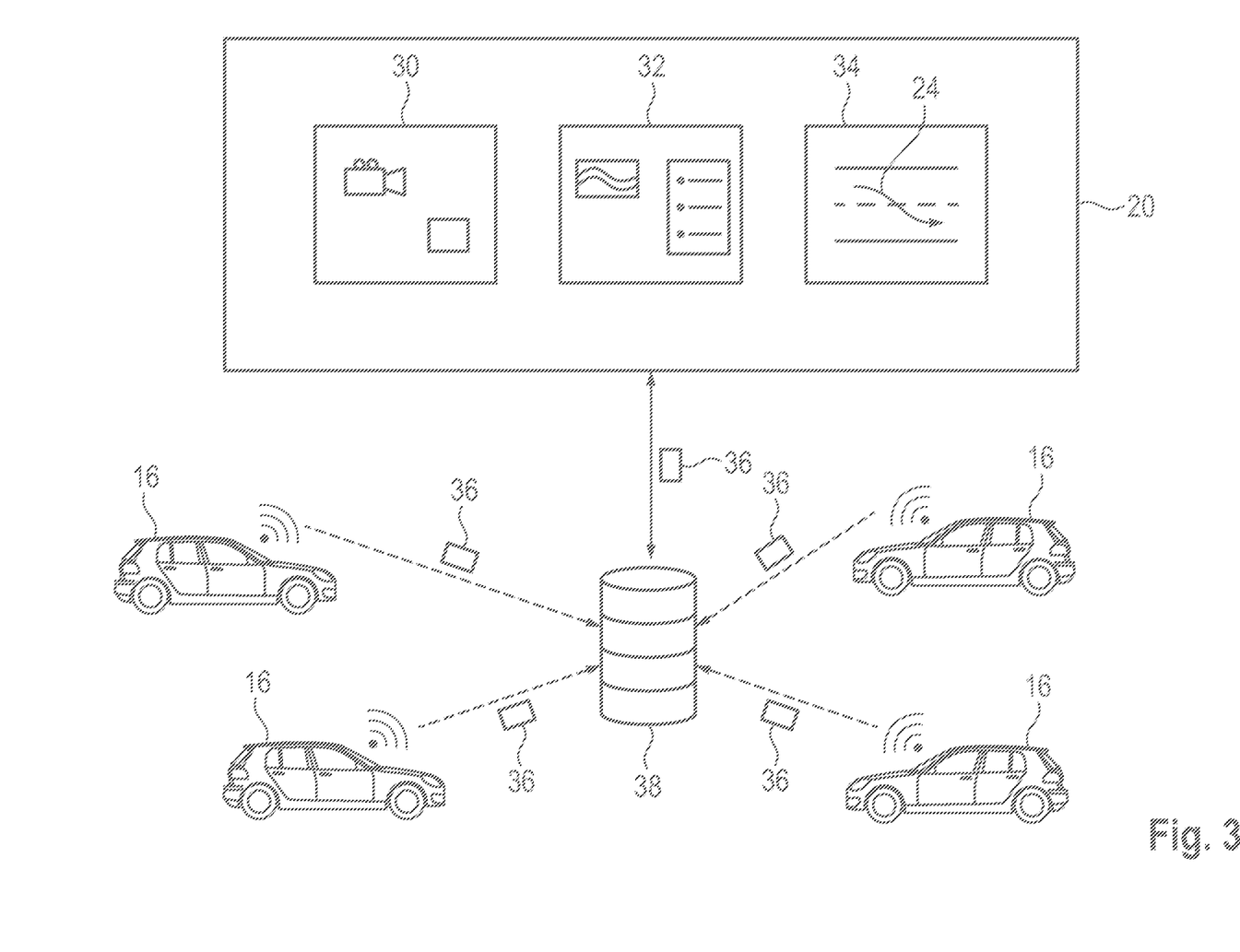
FIG. 3 is a schematic, example representation of transmission of swarm data from a central server apparatus to a lane change assistance system.

FIG. 3 schematically describes a possible embodiment of a lane change assistance system 20 with reference to the components designated and described in connection with FIGS. 1 and 2. In the embodiment shown here, the lane change assistance system 20 comprises a sensor device 30, a locating unit 32, and a lane change assistant 34. The lane change assistance system 20 may be designed to receive historic travel data or swarm data 36 from a plurality of third-party vehicles 16. The swarm data 36 may previously have been transmitted from the third-party vehicles to a central server apparatus 38, where said data may be merged with the digital environment map, for example.

A communication link may be provided between the server apparatus 38 and the lane change assistance system 20 in order to transmit the swarm data 36. The lane change assistance system 20 may also be designed to transmit its own information to the server apparatus 38.

The swarm data 36 may for example contain information as to what travel speeds the third-party vehicles 16 typically traveled at in a relevant starting travel lane 12 and/or target travel lane 14. In other words, the swarm data 36 may be historic travel speed data of the third-party vehicles 16. The average speed can, in future, be resolved depending on the time of day. The time of day may therefore influence the comparison of the different travel speeds as an additional parameter. The swarm data 36 may be merged with the above-described digital environment map of the road 18 in the server apparatus 38. This produces a digital environment map containing information as to what speed vehicles typically travel at along the road 18 stored on the environment map.

As described above, the locating unit 32 of the lane change assistance system 20 may be able to determine a respective own position of the ego vehicle 10 based on the above-described distances between the ego vehicle 10 and the known landmarks 22. For this purpose, the locating unit 32 may use sensor data, for example camera data, of the sensor device 30. If it is identified, for example in the locating unit 32, that a current speed vE of the ego vehicle 10 deviates from a starting travel lane speed vA determined from the swarm data 36, a change of travel lane recommendation 24 may be generated by the lane change assistant 34 of the lane change assistance system 20.

Figure 4:
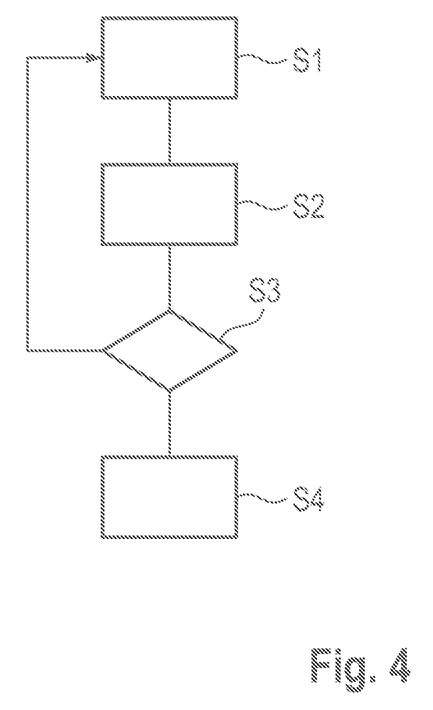
FIG. 4 is a schematic representation of an embodiment of a method for generating a change of travel lane recommendation.

FIG. 4 schematically shows a method for generating a change of travel lane recommendation 24 with reference to the above explanations. The starting scenario for the method described here may be that an ego vehicle 10 travels at its own speed vE along a starting travel lane 12 of a road 18. In a method step S1, a sensor device 30 may record environment data, wherein the environment data comprise current distances between the motor vehicle 10 and predefined stationary landmarks 22 in the surroundings of the motor vehicle 10. In a method step S2, a locating unit 32 may find the landmarks 22 in a digital environment map of the road 18 and determine a current position of the motor vehicle 10 along the starting travel lane 12 in the digital environment map based on the current distances between the motor vehicle 10 and the landmarks 22. As already described above, an average known starting travel lane speed vA may be stored in the digital environment map for the current position of the motor vehicle 10 along the starting travel lane 12. This may for example be calculated from swarm data 36. In a method step S3, a lane change assistant 34 may compare the own speed vE of the motor vehicle 10 with the starting travel lane speed vA. If the comparison reveals that a deviation between the own speed vE and the starting travel lane speed vA reaches a predefined threshold, the lane change assistant 34 may generate a change of travel lane recommendation 24 for the motor vehicle 10. This occurs in a method step S4. However, if the predefined threshold is not reached, the method step S4 may be omitted and the recording of environment data as per method step S1 may be continued instead.

Many drivers have problems with choosing the right travel lane on highways. Often, many travel on a passing lane even though this is not necessary and is prohibited according to the right-hand driving rule. If a fast vehicle approaches from behind, critical situations may arise on account of these behavioral errors and significant differences in speed. Car-to-X communication may be used to warn road users of a potentially critical situation.

According to the current embodiment, swarm data are used to reliably identify travel lanes. Moreover, the swarm data may be used to output an automated lane change recommendation in order, for example, to unburden the driver. If a fast vehicle approaches from behind, a warning cascade may be initiated. This not only helps with compliance with the right-hand driving rule (this also applies in left-hand traffic), but also serves to prevent critical situations when vehicles meet at very different speeds.

Swarm data make it possible to generate the highest possible confidence with regard to the type of neighboring lane (or a travel lane category of a potential target travel lane), i.a. by comparing the swarm speed with the ego vehicle speed.

The teachings herein follow the principle of using vehicle sensors (radar, camera, PDC, etc.) to calculate an environment model around the vehicle. By using the environment sensors as they are used in modern series vehicles, it is possible to form a very accurate model of the vehicle surroundings. All vehicles in the surroundings of the ego vehicle may be detected by means of front radars, front corner radars, rear radars, ultrasound, laser scanners, and/or cameras, for example.

By virtue of digital maps and swarm data (REM—Road Experience Management), very precise information is also available with regard to the passability of the individual travel lanes. For example, a turn-off lane or a shoulder may also be identified. If an unoccupied adjacent lane is identified and this is confirmed by means of swarm data, a lane change recommendation is output.

In one example of a driving situation, a vehicle may approach an ego vehicle, the travel lane to the right of which is unoccupied, from behind at a very different speed. In this case, an urgent change recommendation to the right-hand travel lane is output.

Speed differences between the vehicles may be determined by means of radar (car-to-car is more accurate and has a higher range).

The vehicle in front is displayed the warning or lane change recommendation if the potential target travel lane is unoccupied. This may be done by comparing front camera data and/or radar data and/or lidar data, etc.

Alternatively or additionally, the vehicle behind may identify that the target travel lane is unoccupied (car-to-car/car-to-X, lidar, etc.) and issue a warning to the vehicle driving in front.

In this application scenario, car-to-car communication is therefore used in combination with the swarm data analysis in order to increase traffic safety. The driver of the ego vehicle is warned if a vehicle approaches from behind at a very different speed. If the neighboring lane offers the possibility (confirmed by means of swarm data), an urgent lane change recommendation is issued. This communication may either take place via detection of the fast vehicle by means of a rear camera, rear radars, or car-to-car, and runs on the "slow" vehicle, or it may be a functionality of the faster, approaching vehicle (in this case by means of front sensors).

The use of swarm data may be of importance in order to provide that no change recommendations for off-ramps, shoulders, or the like, are output.

In another example of a driving situation, the current vehicle speed of the ego vehicle may be compared with the average speed in the travel lane on the basis of swarm data. If the following conditions are met, a warning to follow the right-hand driving rule (left-hand driving rule) is issued to the driver of the vehicle:

The neighboring right-hand lane is unoccupied and passable (vice versa in left-hand traffic)

There is no traffic jam

The speed of the ego vehicle is significantly less than the average speed of the travel lane Overall, the examples show how a method for automated lane change recommendation may be provided by means of the invention.

LIST OF REFERENCE NUMERALS

10 Motor vehicle (ego vehicle)
12 Starting travel lane
14 Target travel lane
16 Third-party vehicle
18 Road
20 Lane change assistance system
22 Landmark
24 Change of travel lane recommendation
26 Target area
28 Minimum distance
30 Sensor device
32 Locating unit
34 Lane change assistant
36 Swarm data
38 Server apparatus
vA Starting travel lane speed
vE Own speed
vF Third-party travel speed
vZ Target travel lane speed The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "serving as an example, instance, or exemplification".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for generating a change of travel lane recommendation for a motor vehicle from a starting travel lane into a target travel lane of a road, wherein the motor vehicle moves along the starting travel lane of the road at an own speed, comprising:

determining a current position of the motor vehicle along the starting travel lane in a digital environment map;

determining an average known starting travel lane speed from the digital environment map for the current position along the starting travel lane, the average known starting travel lane speed based on historic speed data of other vehicles having previously traveled along the starting travel lane;

determining an own speed of the motor vehicle;

comparing, by a lane change assistant, the own speed of the motor vehicle with the starting travel lane speed; and determining, based on the comparison, a deviation between the own speed and the starting travel lane speed reaches a predefined threshold, and in response, generating the change of travel lane recommendation for the motor vehicle to move from the starting travel lane into the target travel lane.

2. The method of claim 1, wherein the lane change assistant generates the change of travel lane recommendation in response to a determination that the own speed is closer to an average known target travel lane speed than to the starting travel lane speed.

3. The method of claim 1, wherein the lane change assistant generates the change of travel lane recommendation if it is identified that the target travel lane is unoccupied at least within a target area.

4. The method of claim 1, wherein the lane change assistant generates the change of travel lane recommendation if the target travel lane is assigned to at least one predefined travel lane category.

5. The method of claim 1, wherein the lane change assistant generates the change of travel lane recommendation if at least one distance between the motor vehicle and at least one other motor vehicle in the starting travel lane is less than a predefined minimum distance.

6. The method of claim 1, wherein the lane change assistant generates the change of travel lane recommendation if it is identified that another motor vehicle is approaching the motor vehicle from behind at a predefined minimum speed.

7. The method of claim 1, wherein the lane change assistant generates the change of travel lane recommendation if it is identified that the motor vehicle is passed at least once by another motor vehicle on the target travel lane for example within a predefined time interval.

8. The method of claim 2, comprising checking the plausibility of the starting travel lane speed and/or the target travel lane speed by a comparison with at least one other average known travel speed of another travel lane arranged adjacent to the starting travel lane and/or target travel lane.

9. A lane change assistance system for a motor vehicle that is configured to:

determine a current position of the motor vehicle along a starting travel lane in a digital environment map;

determine an average known starting travel lane speed from the digital environment map for the current position along the starting travel lane, the average known starting travel lane speed based on historic speed data of other vehicles having previously traveled along the starting travel lane;

determine an own speed of the motor vehicle;

compare the own speed of the vehicle with the starting travel lane speed; and determining, based on the comparison, a deviation between the own speed and the starting travel lane speed reaches a predefined threshold, and in response, generating a change of travel lane recommendation for the motor vehicle to move from the starting travel lane into the target travel lane.

10. A motor vehicle having a lane change assistance system of claim 9.

11. The method of claim 2, wherein the lane change assistant generates the change of travel lane recommendation if it is identified that the target travel lane is unoccupied at least within a target area.

12. The method of claim 2, wherein the lane change assistant generates the change of travel lane recommendation if the target travel lane is assigned to at least one predefined travel lane category.

13. The method of claim 3, wherein the lane change assistant generates the change of travel lane recommendation if the target travel lane is assigned to at least one predefined travel lane category.

14. The method of claim 2, wherein the lane change assistant generates the change of travel lane recommendation if at least one distance between the motor vehicle and at least one other motor vehicle in the starting travel lane is less than a predefined minimum distance.

15. The method of claim 3, wherein the lane change assistant generates the change of travel lane recommendation if at least one distance between the motor vehicle and at least one other motor vehicle in the starting travel lane is less than a predefined minimum distance.

16. The method of claim 4, wherein the lane change assistant generates the change of travel lane recommendation if at least one distance between the motor vehicle and at least one other motor vehicle in the starting travel lane is less than a predefined minimum distance.

17. The method of claim 2, wherein the lane change assistant generates the change of travel lane recommendation if it is identified that another motor vehicle is approaching the motor vehicle from behind at a predefined minimum speed.

18. The method of claim 3, wherein the lane change assistant generates the change of travel lane recommendation if it is identified that another motor vehicle is approaching the motor vehicle from behind at a predefined minimum speed.

19. The method of claim 4, wherein the lane change assistant generates the change of travel lane recommendation if it is identified that another motor vehicle is approaching the motor vehicle from behind at a predefined minimum speed.

20. The method of claim 5, wherein the lane change assistant generates the change of travel lane recommendation if it is identified that another motor vehicle is approaching the motor vehicle from behind at a predefined minimum speed.

* * * * *